United States Patent
Junghans et al.

(10) Patent No.: US 6,284,378 B1
(45) Date of Patent: Sep. 4, 2001

(54) ADHESIVE FILM STRIP

(75) Inventors: Andreas Junghans, Hamburg; Bernd Lühmann, Norderstedt, both of (DE)

(73) Assignee: Beiersdorf AG, Hamburg (DE)

( * ) Notice: Subject to any disclaimer, the term of this patent is extended or adjusted under 35 U.S.C. 154(b) by 0 days.

(21) Appl. No.: 08/886,306

(22) Filed: Jul. 1, 1997

(30) Foreign Application Priority Data

Jul. 4, 1996 (DE) .............................. 196 26 870
Jan. 3, 1997 (DE) .............................. 197 08 366

(51) Int. Cl.$^7$ ................................... B32B 27/00
(52) U.S. Cl. ................ 428/421; 428/40.1; 428/41.7; 428/41.8; 428/41.9; 428/194; 428/192
(58) Field of Search ................. 428/40.1, 41.7, 428/41.8, 41.9, 194, 192, 214, 323, 346, 347, 355, 354, 349; 206/411; 156/292

(56) References Cited

U.S. PATENT DOCUMENTS

| | | | |
|---|---|---|---|
| 3,787,531 | 1/1974 | Dahlquist | 428/354 |
| 4,024,312 | 5/1977 | Korpman | 428/343 |
| 4,379,806 | 4/1983 | Korpman | 428/354 |
| 5,491,012 | * 2/1996 | Luhmann | 428/41.6 |
| 5,725,923 | * 3/1998 | Luhmann | 428/40.1 |
| 6,001,471 | * 12/1999 | Bries | 428/343 |
| 6,017,624 | * 1/2000 | Delgado | 428/355 AC |

FOREIGN PATENT DOCUMENTS 33 31 016   10/1984   (DE) .
 330088    8/1989   (EP) .

OTHER PUBLICATIONS

Abstract of DE 33 31 016

* cited by examiner

*Primary Examiner*—Nasser Ahmad
(74) *Attorney, Agent, or Firm*—Norris McLaughlin & Marcus

(57) ABSTRACT

Adhesive film strip for a temporary bond which can be detached without residue and without damage by pulling in the direction of the bond plane, having a layer structure comprising an elastic backing layer which is provided on one or both sides with an adhesive layer, characterized in that both the backing layer and the adhesive layer(s) comprise styrene block copolymers as base polymers, blended with tackifier resins which are compatible with the elastomer block of the styrene block copolymers used.

34 Claims, No Drawings

ADHESIVE FILM STRIP

DESCRIPTION

The invention relates to an adhesive film strip for a temporary bond, which strip can be detached without residue and without damage by pulling in the direction of the bond plane, and to its use for such bonds.

BACKGROUND OF THE INVENTION

Highly elastic adhesive films for temporary bonds which can be re-released by pulling in the direction of the bond plane are known and are obtainable commercially under the designation "tesa Power-Strips". Bonds produced therewith offer a powerful hold and yet can be released again without trace and without damage to the substrate or to the adherends, as is described in DE 33 31 016 C2.

DE 37 14 453, DE 42 22 849, DE 42 33 872, DE 43 39 604, DE 44 28 587, DE 44 31 914 and DE 195 11 288 describe specific embodiments and applications of prior adhesive films.

The adhesive films described in these documents are subject to stringent requirements, for instance:

For flawless functioning they must offer a degree of finger tack (for light bonding=low applied pressure and for immediate loading) and bond strength (throughout the application) which are sufficient for the application in question.

Prerequisites for the detachment process are high extensibility coupled with low offset yield stress and a tear strength which is high in comparison with the detachment force (stripping force).

A marked reduction in finger tack on stretching is advantageous for the detachment process.

For longer-term bonds, an appropriate ageing resistance in the bond joint is essential.

Under high mechanical stresses (high shear loads and tip-shear loads) there may, if unsaturated styrene block copolymers (styrene-isoprene, styrene-butadiene block copolymers) are used, be development of ozone cracks in the adhesive and thus inward tearing of the adhesive films during the detachment process or detachment of the bonded article during the application period.

Especially in the case of bonds which are subject to high shear loads and tip-shear loads, at application temperatures>about 35° C. a very high thermal shear strength is essential for sufficient bond strength.

Many applications desire that the adhesive film be pigmented. The use of pigments, for example $TiO_2$, may, however, have adverse effects on the bond strength, especially when used at high concentrations.

The abovementioned adhesive films consist of only a single layer of adhesive which is required to meet, sufficiently, all of the abovementioned properties for a large number of applications. In this case, varying the formulation of the adhesive layer influences totally a number of these properties. Many product properties, moreover, are in mutual contradiction, and some are almost totally mutually exclusive. The formulation of the adhesives is accordingly complex, with many combinations of properties being impossible to establish to a sufficient degree if at all.

Against the background of this state of the art, the aim of the present invention was to provide highly elastic adhesive films which permit extensively independent control and broad formulatability of individual product properties. This is achieved through the use of adhesive film laminates which consist of a plurality of adhesive layers. It is possible optionally to integrate, between the individual adhesive layers, diffusion barrier layers, which act as diffusion barriers for migratable formulation constituents in adjacent adhesive layers. Through the multilayer structure it is possible to control in a targeted manner and separately from one another the overall properties of novel adhesive film laminates, by varying, for example, the composition (formulation), the thickness and the number of the individual layers, and thus to produce a spectrum of properties denied to the known single-layer systems. In this arrangement, the profile of properties of individual adhesive film layers can be controlled by the nature and amount of the formulation constituents used (polymers, fillers), which show little or no migration capacity, and via the thicknesses of the individual adhesive layers. In the case of adhesive films comprising diffusion barrier layers integrated between the individual adhesive film layers, the concentrations of migratable adhesive film constituents can be adjusted within very wide ranges.

However, the prior art also includes multilayer adhesive films which can be released without residue from the adherends by pulling in the lengthwise direction of the film. However, these films too have grave disadvantages:

Thus WO 92/11333 describes an adhesive tape which is redetachable by pulling in the bond plane and which as backing uses a highly stretchable, substantially nonresilient (nonelastomeric) film having less than 50% resilience after stretching.

WO 92/11332 describes an adhesive tape which is redetachable by pulling in the bond plane and for which it is possible, as backing, to use either a stretchable, highly elastic (elastomeric) film or a highly stretchable, substantially nonresilient film. Adhesive compositions employed are exclusively UV-crosslinked acrylate copolymers.

WO 95/06691 describes adhesive tapes which are redetachable by pulling in the bond plane and which use as their backing a foamed film backing which does not have contact adhesion.

Highly elastic backing materials comprising tackifier resins or plasticizer oils as blend components are not described in WO 11332 or in WO 11333 or in WO 94/21157. Consequently, there is a gap here, which is significant for practical use and limits the application possibilities, for the use of pressure-sensitive adhesive compositions comprising low molecular mass migratable constituents which can migrate into the highly elastic backing materials.

Finally, U.S. Pat. No. 4,024,312 describes highly stretchable adhesive films which possess a backing of highly elastic, thermoplastically processable styrene block copolymers. The backing is coated on at least one side with a pressure-sensitive adhesive composition. The pressure-sensitive adhesives used employ either polyisoprene (e.g. natural rubber) or the styrene block copolymer-based synthetic rubbers which are also employed for the backing material, in a blend with tackifier resins and, if desired, with further blend components. The adhesive tapes can be removed readily from the substrate by stretching parallel to the bond surface. The backing of these adhesive films is described as "basically non-tacky" (col. 1, line 10), although it may include admixed resins. Accordingly, these resins are also described as being those resins which associate with the A blocks of the ABA block copolymers (col. 2, lines 11–16) and are compatible with them (col. 3, lines 10–22). The pressure-sensitive adhesive used can also include resins, i.e. tackifier resins, which associate with the B blocks of the ABA block copolymers (col. 3, lines 58–63).

Although products according to U.S. Pat. No. 4,024,312 may be adequate for some applications, they still have the grave disadvantage for normal practical use that the two types of resin, on account of their relatively low molar masses, migrate, especially at relatively high temperatures, and partition themselves between backing and adhesive composition with the result that it is impossible to obtain constant adhesion properties.

Self-adhesive tapes of this kind do not have constant product properties: mechanical strengths of the backing and properties of the pressure-sensitive adhesive compositions used are irreversibly altered by the diffusion of the resins. Specific formulation and control of the product properties, which is essential for industrial bonds, is therefore impossible.

In the light of this it was an object of the invention to provide adhesive films which are devoid of such disadvantages, or at least do not have them to the same extent, and which nevertheless do not abandon the undisputed advantages of this prior art.

SUMMARY OF THE INVENTION

The invention relates accordingly to adhesive film strips as characterized in more detail in the claims, in particular to an adhesive film strip for a temporary bond, which strip can be detached without residue and without damage by pulling in the direction of the bond plane, having a layer structure comprising an elastic backing layer which is provided on one or both sides with an adhesive layer, characterized in that both the backing layer and the adhesive layer(s) comprise styrene block copolymers as base polymers, blended with tackifier resins which are compatible with the elastomer block of the styrene block copolymers used.

Preference is given in this context to adhesive film strips which are characterized in that the proportions of the tackifier resins in the backing layer and in the adhesive layer(s) is such that throughout the time of application of the adhesive film strips only slight changes in concentration occur in the individual layers.

Preference is likewise given to those which are characterized in that the backing layer and the adhesive layer(s) comprise the same tackifier resins.

Preference is likewise given to those which are characterized in that the proportions of the styrene block copolymers in the backing layer and in the adhesive layer(s) are 15–75% by weight, in particular 30–60% by weight, preferably 35–55% by weight, and the proportions of the tackifier resins in these layers are 15–75% by weight, in particular 30–65%, preferably 35–60% by weight.

Preference is likewise given to those which are characterized in that the tackifier resins are rosin or its derivatives, aliphatic, cycloaliphatic or aromatic-modified aliphatic or aromatic-modified cycloaliphatic tackifier resins, especially esters of partially hydrogenated rosin having softening points of from +70 to +120° C. or, for heat-activatable systems, are rosin derivatives having softening points of up to +160° C.

Preference is likewise given to those which are characterized in that further blend components are present in the backing layer and the adhesive layer(s), especially plasticizers, liquid resins, fillers, antiageing agents and/or further polymers.

Preference is likewise given to those which are characterized in that the proportions of the further blend components (plasticizers, liquid resins, antiageing agents, etc.) which are able to migrate between the individual adhesive layers, in the backing layer and the adhesive layer(s), are such that only slight changes occur in the concentrations in the individual layers over the application period of the adhesive film strips, and in particular are up to 40% by weight.

Preference is likewise given to those which are characterized in that the backing layer and the adhesive layer(s) comprise the same, further blend components which are able to migrate between the individual adhesive layers.

Preference is likewise given to those which are characterized in that the backing layer is provided on both sides with an adhesive layer.

Preference is likewise given to those which are characterized in that between the backing layer and adhesive layers there are integrated barrier layers which act as diffusion barriers for migratable adhesive film constituents, which permit the use of migratable formulation constituents, even in highly differing concentrations, in the layers separated by the diffusion barrier.

Preference is likewise given to those which are characterized in that at one or more of its ends the strip has grip tabs for pulling in the direction of the bond plane.

Preference is likewise given to those which are characterized in that the adhesive layer(s) of said strip is (are) protected by cover paper or cover film.

DETAILED DESCRIPTION OF THE INVENTION

Accordingly, in accordance with the invention, the low molecular mass migratable formulation constituents are incorporated into the individual layers in such a way that there can only be a limited change in the proportions of these compounds in the individual layers over the application period of the adhesive films. In this way it is possible to obtain adhesive films for temporary bonds, which films open up substantially expanded and new application possibilities relative to the prior art. Where no diffusion barrier layers are present between adjacent layers of novel adhesive films, all of the adhesive layers preferably comprise the same low molecular mass constituents and do so in proportions which permit only slight changes in the concentrations within the individual layers in the course of production and in subsequent use of the adhesive tapes. Migration as in the case of products in accordance with U.S. Pat. No. 4,024,312, therefore, is ruled out by the invention. Adhesive films which comprise diffusion barrier layers between adjacent layers permit the use of migratable formulation constituents even in highly different use concentrations.

Novel adhesive films consist of a plurality of layers. Styrene block copolymers are used as the base polymers for all layers. Suitable styrene block copolymers comprise polymer blocks of polystyrene and polyisoprene and/or polybutadiene and/or their hydrogenation products ethylene/butylene and/or ethylene/propylene. In accordance with the invention it is possible to employ linear diblock, triblock or multiblock polymers, radial or star block copolymers and mixtures thereof, and especially systems which comprise elastomer blocks differing in type within a macromolecule (e.g. Kraton Tacky G; Shell). Novel styrene block copolymers may to a minor extent comprise further comonomers, for example maleic anhydride. Typical concentrations for the use of the styrene block copolymers are in the range between 15% by weight and 75% by weight, preferably in the range between 30% by weight and 60% by weight and, with particular preference, in the range between 35% by weight and 55% by weight.

Suitable tackifiers include rosin and its derivatives, aliphatic, cycloaliphatic, aromatic-modified aliphatic, aromatic and phenol-modified tackifier resins, to name but a few. Concentrations of the resins in use are typically in the range between 15% by weight and 75% by weight, preferably in the range between 30% by weight and 65% by weight and, with particular preference, in the range between 35% by weight and 60% by weight. Where rosin and its derivatives are used, it is preferred to employ esters of partially hydrogenated rosin having softening points between +70° C. and +125° C. (ring and ball softening point), while for heat-activatable systems rosin derivatives having softening points of up to about +160° C. are also suitable. In the case of adhesive films which comprise barrier layers between adjacent layers, the polymer content of inner adhesive film layers can be up to 100%.

Further blend components comprise plasticizer oils and liquid resins (used in concentrations of between 0 and max. about 30% by weight), fillers (reinforcing and nonreinforcing), for example silicon dioxide, especially synthetic silica, glass (ground or in the form of beads, hollow spheres or solid spheres), aluminas, zinc oxides, calcium carbonates and titanium dioxides, to name but a few, and antiageing agents (primary and secondary antioxidants, light stabilizers, antiozonants, metal deactivators, etc.). Blend components likewise comprise polymers which, in particular, affect the ozone resistance of the block copolymers, such as, for example, polyvinyl acetates and ethylene-vinyl acetate copolymers.

Suitable diffusion barrier layers are those materials which form a diffusion barrier—sufficient for the particular application—for migratable formulation constituents present in adjacent adhesive film layers. Preferred materials comprise barrier polymers based on partially crystalline and amorphous polyamides and mixtures of the two (e.g. Ultramid 1 C and other Ultramids; BASF). Also suitable are barrier polymers based on vinylidene chloride copolymers, acrylonitrile copolymers and also polyvinyl alcohols and ethylene-vinyl alcohol copolymers.

As explained, the tackifier resins employed in accordance with the invention are of excellent compatibility with the elastic middle block and therefore produce the contact adhesion. This compatibility makes it possible not only to fine-tune the contact adhesion but also to control the glass transition temperature of the elastomer matrix (the term matrix here always refers to the elastomer resin phase, i.e. to the B blocks together with the tackifier resins employed), which regulates the contact adhesion as a function of the temperature as well. The latter makes it possible to have glass transition temperatures in the vicinity of, and above, room temperature as well and is therefore important for heat-activatable adhesive films.

The novel adhesive film strips consist of at least two, preferably three but alternatively even more than three layers which may optionally be present in a form separated from one another by diffusion barrier layers. As elastomeric component, the individual layers comprise the above-described styrene block copolymers, alone or in a blend with further polymers. Different layers can comprise identical or different styrene block copolymers in different use concentrations. Blend components which are subject to no notable migration within the period of the use of the adhesive laminates (fillers, polymers) can be present in the individual layers in different proportions. Migratable formulation constituents, such as tackifier resins and plasticizer oils, for example, are preferably incorporated into the individual layers in concentrations which are such that the change in concentration (based on the overall ingredients of the respective adhesive layer) per formulation constituent within the period of use is less than 25%, preferably less than 15% and, with particular preference, less than 7.5%. Relative changes in the concentrations of individual formulation constituents (based on the amount of the particular formulation constituent employed in the particular adhesive layer) are, given use concentrations >10% by weight, less than 50%, preferably <30%, particularly preferably <20%. Changes in concentration can be determined analytically by means, for example, of gel permeation chromatography or else by NMR measurements.

The distribution of the resins over elastomer phase and block polystyrene domains can be determined analytically by means, for example, of Theological investigations on mixtures of the corresponding styrene block copolymers and tackifier resins by dynamic mechanical spectroscopy (DMA) or else by determining the static glass transition temperature (by means, for example, of differential calorimetry (DSC or DTA)) as a function of the resin concentration. A good estimate of the distribution of resin over the elastomer phase and the block polystyrene domains is also given by cloud point measurements in selected solvents/solvent mixtures. Tables of values relating to such measurements are provided by many resin manufacturers (see, for example, "Selection guide for Hercules Hydrocarbon Resins" from Hercules). Pure aliphatic hydrocarbon resins are virtually incompatible with the block polystyrene domains. When using such resins, therefore, it can be assumed that they are present exclusively in solution in the elastomer phase. Accordingly, the concentrations of these resins used in adhesive films which do not include diffusion barrier layers are advantageously chosen such that the ratio of elastomer block to aliphatic resin is constant for the individual layers of the novel adhesive films (see also Example 6). Rosins are highly compatible with the elastomer matrix but in some cases are also miscible with the block polystyrene domains. Correspondingly, as a starting point for formulation of adhesive films which do not include barrier layers, the ratio of overall styrene block copolymer content and resin content can be kept constant between the individual adhesive film layers. Where barrier layers are employed, it is possible to vary much more broadly the concentration of migratable formulation constituents used in adjacent layers.

The thickness of the individual layers can, in particular, be between 5 $\mu$m and 3000 $\mu$m, with the overall thickness being, in particular, between about 50 and 3000 $\mu$m, depending on application. Preferred layer thicknesses for three-layer laminates are between 75 $\mu$m and 2000 $\mu$m for the inner layer and from 15 to 500 $\mu$m for the outer layers.

Individual adhesive layers can be of normal tackiness (showing contact adhesion at room temperature) or else can be heat-activatable, i.e. showing notable finger tack only at elevated temperature.

The multilayer structure of novel adhesive film strips provides them with greatly expanded options for adjusting the product properties relative to single-layer systems. In some cases, this gives rise to completely new kinds of product properties. Adhesive and cohesive properties of the individual adhesive layers can be chosen individually to a large extent by formulation and adjustment of their thickness. For the metal layers in particular it is possible to use a broad range of non-migratable blend components which are excluded from single-layer systems because of their adverse effects on the adhesive properties. The list below gives some product advantages of multilayer adhesive films over single-layer films.

Unlike single-layer systems, multilayer systems permit the production of adhesive films with differential (asymmetric) adhesion properties. By this means it is possible to realize systems whose adhesion properties are tailored to the substrates used, in terms of bonding performance and redetachability without residue. By using fillers in one layer of a two-layer adhesive film it is thus possible, for example, to obtain a controlled level of reduction in the adhesion (adhesive force) of one side of the adhesive film. By using block copolymers with a high block polystyrene content and/or a high glass transition temperature of the elastomer blocks in an outer layer it is possible to realize systems which on one side show normal contact adhesion (normal contact adhesion=contact adhesion at room temperature) while the second adhesive film surface features sufficient tack for a good adhesive bond only after heat activation.

By exclusive addition of colour pigments to the middle layer of three-layer adhesive films, or to one of the middle layers in the case of adhesive film laminates with more than three layers, it is possible substantially to eliminate the influence of the pigments on the adhesive properties of the -adhesive films. In many cases it is possible by this means to obtain multilayer adhesive films which in comparison with pigmented, single-layer adhesive films permit a significant increase in the bond strengths with a virtually identical visual appearance of the adhesive films.

By using styrene-ethylene/butylene or styrene-ethylene/propylene or styrene-butadiene block copolymers in the middle layer and styrene-isoprene-styrene block copolymers in the outer layers it is possible to obtain three-layer adhesive films characterized by high adhesion and by low propensity to tear on redetachment even after ozone exposure.

Additions of polyvinyl acetates or ethylene-vinyl acetate copolymers or of reinforcing fillers, for example silica (e.g. Aerosils), to pressure-sensitive adhesive compositions based on styrene block copolymers generally bring about a marked reduction in the finger tack while significantly increasing the ozone resistance. Through the exclusive addition of corresponding compounds to the middle layer it is possible likewise to obtain adhesive films characterized by high adhesion and by low propensity to tear on redetachment even after ozone exposure.

By varying the polymer concentration, the diblock content, the nature of the elastomer block, the block polystyrene content and the molar mass of the block copolymers used, and also the thickness of individual layers, it is possible to a large extent to control the mechanical properties of the novel adhesive films, especially the offset yield stress as a function of the degree of stretching. By this means it is possible to control the redetachment properties in a manner very largely independent of the top layers. Thus it is possible, by controlled variation of the block polystyrene content and/or of the diblock content and/or the amount of styrene block copolymer in the middle layer and/or the relative thickness of the top layers to the middle layer, given a constant overall thickness of the adhesive films, to control to a large extent the force required for detachment. By using styrene block copolymers with a high diblock content and/or a low block polystyrene content in the middle layer and using styrene block copolymers having a high block polystyrene content and/or a low diblock content in the top layers it is thus possible, for example, to realize three-layer adhesive films which couple high bond strength with a low stripping force.

By using highly ozone-resistant styrene block copolymers in the outer layers it is possible to realize ozone-resistant multilayer films using even block copolymers of low ozone resistance as middle layer. When using, say, SIS block copolymers with a low block copolymer content and/or a high diblock content for the middle layer it is thus possible, for example, to realize adhesive films of substantially improved ozone resistance, which because of the low Shore hardness of the middle layer at the same time show a high degree of conformity to rough substrates.

By using styrene block copolymers with a high triblock content and/or a high block polystyrene content in the first layer and with a high diblock content and/or low block polystyrene content in the second layer it is possible to realize adhesive films having improved thermal shear strength and high contact adhesion on one side. Such systems are particularly suitable when bonding to substrates which have surface temperatures>>room temperature.

Novel adhesive film strips can be prepared in particular by solvent coating and by melt coating. For layer thicknesses>about 75 μm, melt coating is usually preferred on economic grounds. Two or more layers can be joined by direct coating or by lamination, especially hot lamination. A particularly preferred preparation technique is coextrusion, in which the individual layers are brought together in the melt and are applied in two-layer or multilayer coextrusion dies. The latter method can be employed with particular advantage when optimum cohesion between the individual adhesive layers is critical. The optional barrier layers are preferably likewise produced by coextrusion. Another preferred method is lamination, especially hot lamination.

Maximum tensile strength, elongation at break

The measurements are carried out in accordance with DIN 53504 using standard test specimens of size S 2 at a traction rate of 300 mm/min.

Adhesive force

The adhesive force (band strength) test is carried out in accordance with ASTM D 1000-82a. The peel angle is 90° or 180°. The double-sided adhesive films are reinforced on one side with a 50 μm thick polyester film (Hostaphan RN 50) in the case of the 180° peel angle and with tesa pack 4588 in the case of the 90° peel angle.

Tip shear strength

To determine the tip shear strength, the adhesive film to be tested, which measures 20 mm*50 mm and is provided at one end on both sides with a non-tacky grip-tab region (obtained by laminating on 25 μm thick, biaxially oriented polypropylene film), is bonded to the centre of a highly polished square steel plate measuring 40 mm*40 mm*3 mm (height*width*thickness). On its back the steel plate is provided centrally with a 10 cm long steel rod which sits vertically on the surface of the plate. The test specimens obtained are bonded to the test substrate with a force of 100 N (press-on time=5 s) and are left in the unloaded state for 5 minutes. After setting the chosen tip shear load by suspending a weight (lever arm and mass of the weight are selectable), the time is measured until the bond fails.

Ozone resistance

The adhesive film strip to be tested, measuring 50 mm×20 mm (height*width), which is provided at one end on both sides with a non-tacky grip-tab region measuring 12 mm*20 mm (height*width) by laminating on a 25 µm thick, biaxially oriented PP film, is bonded between two overlapping steel plates, which are offset in parallel to one another in the longitudinal direction and measure 50 mm×30 mm×2 mm (length*width*thickness), so as to give an overlap area of 20 mm×20 mm. The resulting bond area, owing to the grip-tab film which projects by about 2 mm into the bond, is 18 mm×20 mm. The test specimens prepared in this way are exposed to a shear load of 5 N/18*20 mm² for 144 h in a test chamber which is conditioned at 40° C. and is enriched with 50 pphm of ozone. After reconditioning to room temperature, a manual test is carried out of whether the adhesive film strip can be pulled out from the bond joint, starting from the grip tab, parallel to the bond surface. The release rate is about 50 mm/s. An assessment is made of whether the adhesive film strip is released without residue and without tearing from the steel substrate.

Detachment force (stripping force)

To determine the detachment behaviour, a test specimen is prepared. For this purpose an adhesive film measuring 50 mm*20 mm (length*width) with a non-tacky grip-tab region at the top end is bonded between two steel or plastic plates A and A' (arranged so as to overlap one another precisely) measuring 50 mm×30 mm. The steel (or plastic) plates each carry at their lower end a bore for accommodating an S-shaped steel hook. The bottom end of the steel hook carries a further steel plate B.

The adhesive film strip is pulled out parallel to the bond plane at a traction rate of 1000 mm/min. During this procedure the detachment force required (stripping force) is measured in N/cm and the steel (or plastic) plates are checked for residues of adhesive composition.

EXAMPLE 1

Multilayer adhesive films were obtained by laminating single-layer primary films. To prepare the primary films, about 30 g of composition are compressed in a Bucher-Guyer press (type: KHL 50) preheated to +110° C. with a force of from 4000 N to 200,000 N for a period t=10 minutes to form films. The film thicknesses obtained are between 50 µm and 800 µm. Multilayer adhesive films were obtained by laminating the desired primary films together by means of a manual roller weighing 2 kg and measuring 20 cm in width followed by compression once more in the above Bucher press at 40,000 N and 110° C. Two-layer, three-layer and four-layer adhesive films can be realized.

The following two-layer laminates are prepared in accordance with the above-described method:

Sample A

Adhesive layer A1 (formulation 1a):
  50 parts of Vector 4211 (Dexco); 50 parts of Foral 105-E (Hercules); 0.5 part of Irganox 1010 (Ciba)
Adhesive layer A2 (formulation 1b):
  50 parts of Vector 4211; 50. parts of Foral 105-E; 20 parts of microtalc (Micro-Talc IT EXTRA; Norwegian Talc); 0.5 part of Irganox 1010

Sample B

Adhesive layer B1 (formulation 1c):
  50 parts of Vector 4114; 50 parts of Foral 105-E; 0.5 part of Irganox 1010
Adhesive layer B2 (formulation 1d):
  50 parts of Kraton D 1107; 50 parts of Foral 105-E; 0.5 part of Irganox 1010

The following technical properties were found:

| Sample No. | Structure | Adhesive layer 1 | Adhesive layer 2 | Adhesive Force steel; 180° side 1//side 2 |
|---|---|---|---|---|
| 1A | Two-layer | A1 430 µm | A2 410 µm | 27 N/cm//19 N/cm |
| 1B | Two-layer | B1 400 µm | B2 430 µm | 48 N/cm//28 N/cm |

| Sample No. | Stripping force |
|---|---|
| 1A | 9.4 N/cm (polystyrene; 1000 mm/min separation rate) |
| 1B | 4.4 N/cm (polystyrene; 1000 mm/min separation rate) |

By changing the type of elastomer used and the amount of filler used it is possible to vary individually the adhesive forces of the individual adhesive film surfaces and thus to tailor the adhesive forces to the particular substrates used.

EXAMPLE 2

The following three-layer laminate is prepared in accordance with the method described under Example 1:

Top layers (formulation 2a):
  50 parts of Vector 4211; 50 parts of Foralyn 110 (Hercules); 0.5 part of Irganox 1010
Middle layer (formulation 2b):
  50 parts of Vector 4211; 50 parts of Foralyn 110; 0.5 part of Irganox 1010; 5 parts of Kronos 2160

The top layer thicknesses of the three-layer laminate are each 100 µm, while the thickness of the middle layer is 440 µm, giving an overall thickness of the adhesive film laminate of 640 µm. For comparison, single-layer adhesive films of formulations 2a and 2b, of corresponding thickness, are prepared.

The adhesive films (Samples Nos. 2A, 2B) are subjected to a tip shear strength test (lever arm=90 mm, tip shear load=20 N, T=23° C., 50±5% rel. humidity). The resulting properties are as follows:

| Sample No. | Structure | Top layers | Middle layer | Tip shear holdout time* | Appearance |
|---|---|---|---|---|---|
| 2A | Single-layer | — | 2a 650 µm | 8 days | Transparent |
| 2B | Single-layer | — | 2b 650 µm | < 1 day | White |
| 2C | Three-layer | 2a each 100 µm | 2b 440 µm | > 8 days | White |

*90 mm lever arm, 20 N shear load; mean values

The bonding strength (tip shear strength) can be adjusted by controlled use of the pressure-sensitive adhesive composition of the outer layers, the optical appearance by pigmentation of the inner layer.

EXAMPLE 3

The following three-layer laminate is prepared in accordance with the method described under Example 1:

Top layers (formulation 3a):
  50 parts of Vector 4211; 50 parts of Foral 105-E; 0.5 part of Irganox 1010; 3 parts of Kronos 2160 (Kronon Titan)
Middle layer (formulation 3b):
  50 parts of Vector 8508; 50 parts of Foral 105-E; 0.5 part of Irganox 1010; 3 parts of Kronos 2160

The thicknesses of the top layers are each 100 μm, that of the middle layer 500 μm, giving an overall thickness of the adhesive film laminate of 700 μm. For comparison, single-layer adhesive films of formulations 3a and 3b, of corresponding thickness, are prepared.

The three-layer laminates (Sample No. 3C) and single-layer adhesive films of formulations 3a and 3b (Sample Nos. 3A, 3B) are subjected to a comparative ozone resistance test. 5 adhesive film samples are tested per product structure. The following properties result:

| Sample No. | Structure | Top layers | Middle layer | Ozone resistance |
|---|---|---|---|---|
| 3A | Single-layer | — | 3a 700 μm | Sample torn |
| 3B | Single-layer | — | 3b 700 μm | Redetachable without tearing |
| 3C | Three-layer | 3a each 100 μm | 3b 440 μm | Redetachable without tearing |

| Sample No. | Adhesive force 180° |
|---|---|
| 3A | 34 N/cm |
| 3B | 24 N/cm |
| 3C | 28 N/cm |

Unlike Sample No. 3A, the corresponding three-layer laminate 3C can be redetached without tearing after ozone exposure.

EXAMPLE 4

The following three-layer laminate is prepared in accordance with the method described under Example 1:

Top layers (formulation 1a):
50 parts of Vector 4211; 50 parts of Foral 105-E; 0.5 part of Irganox 1010

Middle layer (formulation 4a):
50 parts of Kraton G 1652; 50 parts of Foral 105-E; 0.5 part of Irganox 1010

The thicknesses of the top layers are each 125 μm, that of the middle layer is 410 μm, giving an overall thickness of the adhesive film laminate (Sample No. 4C) of 660 μm. For comparison, single-layer adhesive films of formulations 1a and 4a (Sample Nos. 4A, 4B), of corresponding thickness, are prepared.

The adhesive films are subjected to an ozone resistance test. 5 adhesive film samples are tested per product structure. The pure SEBS middle layer is merely blocking, but does not have sufficient finger tack for good bond strength under practicable press-on pressures. It was therefore not taken into account in the ozone resistance test.

| Sample No. | Structure | Top layers | Middle layer | Ozone resistance |
|---|---|---|---|---|
| 4A | Single-layer | — | 1a 650 μm | Sample tears |
| 4B | Single-layer | — | 4a 640 μm | Not possible to carry out (see above) |
| 4C | Three-layer | 1a each 125 μm | 4a 410 μm | Redetachable without tearing |

| Sample No. | Adhesive force 180° |
|---|---|
| 4A | 27 N/cm |
| 4B | Measurement not possible (see above) |
| 4C | 22 N/cm |

In comparison with Sample No. 4A, the three-layer laminate 4C can be redetached without tearing after ozone exposure.

EXAMPLE 5

The following three-layer laminate is prepared in accordance with the method described under Example 1:

Top layers (formulation 1a):
50 parts of Vector 4211; 50 parts of Foral 105-E; 0.5 part of Irganox 1010

Middle layer (formulation 5a):
40 parts of Vector 4211; 50 parts of Foral 105-E; 10 parts of Elvax 170; 0.5 part of Irganox 1010

The thicknesses of the top layers are each 125 μm, that of the middle layer is 450 μm, giving an overall thickness of the adhesive film laminate of 700 μm. For comparison, single-layer adhesive films of formulations 1a and 5a, of corresponding thickness, are prepared.

The adhesive films are subjected to an ozone resistance test. 5 adhesive film samples are tested per product structure. The single-layer adhesive film containing Evlax 170 is markedly blocking, but does not have sufficient finger tack for good bond strength under practicable press-on pressures and was therefore not taken into account in the ozone resistance test. Sample No. 5B has only a very low finger tack. Testing for ozone resistance is therefore not possible.

| Sample No. | Structure | Top layers | Middle layer | Ozone resistance |
|---|---|---|---|---|
| 5A | Single-layer | — | 1a 650 μm | Sample tears |
| 5B | Single-layer | — | 5a 620 μm | Not possible to carry out (see above) |
| 5C | Three-layer | 1a each 125 μm | 5a 450 μm | Redetachable without tearing |

In comparison with Sample No. 5A, the three-layer laminate 5C can be redetached without tearing after ozone exposure.

EXAMPLE 6

The following single-layer and three-layer laminates are prepared in accordance with the method described under Example 1.

Formulations of the pressure-sensitive adhesive compositions used

| Formulation | Elastomer | Resin | Oil |
|---|---|---|---|
| 6a | 44.0 parts of Vector 4114 | 44.5 parts of ECR 385 | 10 parts of Ondina G 41 |

-continued

| Formulation | Elastomer | Resin | Oil |
|---|---|---|---|
| 6b | 48.4 parts of Vector 4411 | 40.9 parts of ECR 385 | 9.2 parts of Ondina G 41 |

Both adhesive compositions comprise 0.5 part of Irganox 1010 as antiageing agent The structure and selected technical data of the single-layer adhesive films and of the three-layer laminates are as follows:

| Sample No. | Structure | Top layers | Middle layer | Stripping force |
|---|---|---|---|---|
| 6A | Three-layer | 6a each 50 μm | 6b 120 μm | 6.2 N/cm |
| 6B | Three-layer | 6a each 55 μm | 6b 210 μm | 7.7 N/cm |
| 6C | Three-layer | 6a each 50 μm | 6b 410 μm | 15 N/cm |
| 6D | Three-layer | 6a each 60 μm | 6a 410 μm | 2.7 N/cm |
| 6E | Single-layer | — | 6a 390 μm | 1.8 N/cm |
| 6F | Single-layer | — | 6b 420 μm | 4.3 N/cm |

By varying the sequence of the adhesive layers and the thickness of the middle layer it is possible to obtain broad variation and targeted control of the stripping forces.

EXAMPLE 7

The following single-layer and three-layer laminates are prepared in accordance with the method described under Example 1:
Formulations of the pressure-sensitive adhesive compositions used

| Formulation | Elastomer | Resin | Antiageing agent |
|---|---|---|---|
| 7a | 50 parts of Vector 4411 | 50 parts of Foral 105-E | 0.5 part of Irganox 1010 |
| 1c | 50 parts of Vector 4114 | 50 parts of Foral 105-E | 0.5 part of Irganox 1010 |

The structure and selected technical data of the single-layer adhesive films and of the three-layer laminates are as follows:

| Sample No. | Structure | Top layers | Middle layer | Stripping force | Adhesive force 180° |
|---|---|---|---|---|---|
| 7A | Three-layer | 7a each 130 μm | 1c 500 μm | 8 N/cm | 9 N/cm |
| 7B | Single-layer | | 7a 700 μm | 14 N/cm | 6 N/cm |
| 7C | Single-layer | | 1c 800 μm | 3 N/cm | 46 N/cm |

| Sample No. | Structure | Tip shear holdout time | Bond area on Fibre Line* |
|---|---|---|---|
| 7A | Three-layer | >30 h | 50% |
| 7B | Single-layer | >30 h | 30% |
| 7C | Single-layer | 5 h | 100% |

*Press-on time = 10 s; press-on pressure = 50N/200 mm²; Fibre Line = textured wallpaper of defined surface roughness (from Kunststoff-Krüger, Hamburg).

Through the nature and thickness of the middle layer used a targeted control of the stripping force is possible. By using adhesive film laminates with softer middle layers (achieved in this case by the lower block polystyrene content) it is possible to obtain a significant reduction in the stripping forces (in comparison with the single-layer adhesive film with the same thickness consisting of pure top layer material) and thus very user-friendly detachment properties.

At the same time, the softer middle layer brings about an increase in the bond area, which especially on rough substrates can lead to an improvement in the bond strength.

EXAMPLE 8

The following single-layer and three-layer laminates are prepared in accordance with the method described under Example 1:
Formulations of the pressure-sensitive adhesive compositions used:

| Formulation | Elastomer | Resin | Antiageing agent |
|---|---|---|---|
| 4a | 50 parts Kraton G 1652 | 50 parts Foral 105-E | 0.5 part Irganox 1010 |
| 1c | 50 parts Vector 4114 | 50 parts Foral 105-E | 0.5 part Irganox 1010 |

Structure and selected technical data of the single-layer adhesive films and of the three-layer laminates:

| Sample No. | Structure | Top layers | Middle layer | Stripping force* | Adhesive force* 180°* |
|---|---|---|---|---|---|
| 7A* | Three-layer | 4a each 130 μm | 1c 450 μm | 4.9 N/cm | 2 N/cm |
| 7B* | Single-layer | | 4a 700 μm | 7.0 N/cm | 3 N/cm |
| 7C* | Single-layer | | 1c 800 μm | 3.2 N/cm | 46 N/cm |

Samples Nos. 7A and 7B do not show contact adhesion at room temperature
*Sample bonding: In accordance with ASTM D 1000-82a at room temperature

| Sample No. | Structure | Tip shear holdout time** | Stripping force II** | Adhesive force II** |
|---|---|---|---|---|
| 7A** | Three-layer | >14 d | 12 N/cm | 40 N/cm |
| 7B** | Single-layer | >14 d | 19 N/cm | 29 N/cm |
| 7C** | Single-layer | 5 h | 3 N/cm | 46 N/cm |

**Sample bonding: in accordance with ASTM D 1000-82a plus 45 minutes' storage of the test specimens at +70° C. in a drying oven. Thicknesses of the middle and top layers identical with Samples Nos. 7A to 7C.

Sufficient bond strength is achieved for Samples Nos. 7A and 7B only after prior thermal initiation. Practicable stripping forces are possible in this case, coupled with high bond strength, only with the three-layer laminate.

EXAMPLE 9

Three-layer film with middle layer of low ozone resistance and outer layer of high ozone resistance.

The following three-layer laminate is prepared in accordance with the method described under Example 1 and investigated in comparison with the single-layer adhesive film Sample No. 9B:

Top layers (formulation 9a):
50 parts of Vector 8508; 50 parts of Foral 105-E; 0.5 part of Irganox 1010

Middle layer (formulation 1b):
    50 parts of Vector 4211; 50 parts of Foral 105-E; 0.5 part of Irganox 1010

Structure and selected technical data of the single-layer adhesive films and of the three-layer laminates:

| Sample No. | Structure | Top layers | Middle layer | Ozone resistance |
|---|---|---|---|---|
| 9A | Three-layer | 9a each 120 μm | 1b 510 μm | Redetachable without tearing |
| 9B | Single-layer | | 9a 450 μm | Redetachable without tearing |
| 9C | Single-layer | | 1b 700 μm | Sample tears |

| Sample No. | Structure | KK Steel 180° |
|---|---|---|
| 9A | Three-layer | 26 N/cm |
| 9B | Single-layer | 20 N/cm |
| 9C | Single-layer | 27 N/cm |

In contrast to Example 9C, the three-layer laminate can be redetached without tearing after ozone exposure.

EXAMPLE 10

Three-layer adhesive film with diffusion barrier layers between the individual adhesive layers.

Primary films based on the following formulations are prepared in accordance with Ex. 1:

| Formulation | Thickness | |
|---|---|---|
| 1a | 120 μm | for the top layers |
| 10b* | 400 μm | for the middle layer |

*10b: 45 parts of Vector 4211; 45 parts of ECR373 (Exxon), 10 parts of Ondina G 41 (Shell), 0.5 part of Organox 1010

12 μm thick diffusion barrier layers were obtained by drying an ethanol/water (80 parts by volume to 20 parts by volume) solution of Ultramid 1 C (BASF) on silicone-treated release paper. The barrier layers can be transferred to the subsequent top layers by rolling them onto the corresponding top layers (formulation 1a) using a manual roller weighing 2 kg and measuring 20 cm in width. Lamination of the top layers modified in this way to the adhesive film middle layer (formulation 10b) takes place accordingly. The resulting multilayer laminate is compressed in accordance with Ex. 1 at 40,000 N and 110° C. in the above-described Bucher-Guyer press.

The resulting adhesive films can be removed without residue and without destruction from between sheets, bonded using them, of white writing paper (weight per unit area: 80 g/m²) by stretching essentially in the bond plane. Even after storage of correspondingly bonded papers for 4 weeks at +40° C., no migration of the plasticizer used in the middle layer, Ondina G 41, into the paper can be detected.

What is claimed is:
1. An adhesive film strip for a temporary bond which can be detached without residue and without damage by pulling in the direction of the bond plane, said adhesive film strip having a multi-layer structure comprising an elastic backing layer which is provided on both sides with an adhesive layer, wherein both the backing layer and the adhesive layer(s) are composed of chemical compositions comprising styrene block copolymers as base polymers, which styrene block copolymers are blended with tackifier resins which are compatible with an elastomer block of the styrene block copolymers used, but wherein the chemical composition of the backing layer is different from the chemical composition of the adhesive layers.

2. Adhesive film strip according to claim 1, wherein the backing layer and the adhesive layers comprise the same tackifier resins or plasticizer oils.

3. Adhesive film strip according to claim 1, wherein the proportions of the styrene block copolymers in the backing layer and in the adhesive layers are 15–75% by weight.

4. Adhesive film strip according to claim 3, wherein the proportions of the styrene block copolymers in the backing layer and in the adhesive layers are 30–60% by weight or the proportions of the tackifier resins in these layers are 30–65% by weight.

5. Adhesive film strip according to claim 3, wherein the proportions of the styrene block copolymers in the backing layer and in the adhesive layers are 35–55% by weight or the proportions of the tackifier resins in these layers are 35–60% by weight.

6. Adhesive film strip according to claim 1, wherein the tackifier resins are rosin or derivatives thereof or aliphatic or aromatic-modified aliphatic tackifier resin.

7. Adhesive film strip according to claim 6, wherein the tackifier resins are selected from the group consisting of esters of partially hydrogenated rosin having softening points of from +70 to 125° C. or, for heat-activatable systems, from the group consisting of rosin derivatives having softening points of up to +160° C.

8. Adhesive film strip according to claim 1, wherein further comprising additional blend components present in the backing layer and in the adhesive layers, said additional blend components being selected from the group consisting of plasticizers, liquid resins, fillers and antiageing agents.

9. Adhesive film strip according to claim 8, wherein the proportions of the additional blend components in the backing layer and in the adhesive layers are up to 40% by weight.

10. Adhesive film strip according to claim 8, wherein the backing layer and the adhesive layers comprise the same migratable blend components.

11. Adhesive film strip according to claim 1, which comprises at one of its ends a grip tab for pulling the direction of the bond plane.

12. Adhesive film strip according to claim 1, wherein its adhesive layers are protected by cover paper or cover film.

13. Adhesive film strip according to claim 1, wherein at least one diffusion barrier layer is provided between said backing layer and at least one of said adhesive layers.

14. Adhesive film strip according to claim 1, wherein the concentration of the tackifier resin in the backing layer and in the adhesive layers is such that any change in said concentration is less than 25% during a period of use of said adhesive film strip.

15. Adhesive film strip according to claim 14, wherein the concentration of the tackifier resin in the backing layer and in the adhesive layers is such that any change in said concentration is less than 15% during a period of use of said adhesive film strip.

16. Adhesive film strip according to claim 14, wherein the concentration of the tackifier resin in the backing layer and in the adhesive layers is such that any change in said concentration is less than 7.5% during a period of use of said adhesive film strip.

17. An adhesive film strip for a temporary bond which can be detached without residue and without damage by pulling in the direction of the bond plane, said adhesive film strip having a multi-layer structure comprising an elastic backing layer which is provided on one or both sides with an adhesive layer, and a diffusion barrier between said backing layer and at least one of said adhesive layer(s), wherein both the backing layer and the adhesive layer(s) are composed of chemical compositions comprising styrene block copolymers as base polymers, which styrene block copolymers are blended with tackifier resins which are compatible with an elastomer block of the styrene block copolymers used, but wherein the chemical composition of the backing layer is different from the chemical composition of the adhesive layer(s).

18. Adhesive film strip according to claim 17, wherein the backing layer and the adhesive layer(s) comprise the same tackifier resins or plasticizer oils.

19. Adhesive film strip according to claim 17, wherein the proportions of the styrene block copolymers in the backing layer and in the adhesive layer(s) are 15–75% by weight.

20. Adhesive film strip according to claim 19, wherein the proportions of the styrene block copolymers in the backing layer and in the adhesive layers are 30–60% by weight or the proportions of the tackifier resins in these layers are 30–65% by weight.

21. Adhesive film strip according to claim 19, wherein the proportions of the styrene block copolymers in the backing layer and in the adhesive layers are 35–55% by weight or the proportions of the tackifier resins in these layers are 35–60% by weight.

22. Adhesive film strip according to claim 17, wherein the tackifier resins are rosin or derivatives thereof or aliphatic or aromatic-modified aliphatic tackifier resin.

23. Adhesive film strip according to claim 22, wherein the tackifier resins are selected from the group consisting of esters of partially hydrogenated rosin having softening points of from +70 to 125° C. or, for heat-activatable systems, from the group consisting of rosin derivatives having softening points of up to +160° C.

24. Adhesive film strip according to claim 17, wherein further comprising additional blend components present in the backing layer and in the adhesive layer(s), said additional blend components being selected from the group consisting of plasticizers, liquid resins, fillers and antiageing agents.

25. Adhesive film strip according to claim 24, wherein the proportions of the additional blend components in the backing layer and in the adhesive layer(s) are up to 40% by weight.

26. Adhesive film strip according to claim 24, wherein the backing layer and the adhesive layer(s) comprise the same migratable blend components.

27. Adhesive film strip according to claim 17, wherein the backing layer is provided on both sides with an adhesive layer.

28. Adhesive film strip according to claim 17, which comprises at one of its ends a grip tab for pulling the direction of the bond plane.

29. Adhesive film strip according to claim 17, wherein its adhesive layer(s) is (are) protected by cover paper or cover film.

30. Adhesive film strip according to claim 17, wherein the concentration of the tackifier resin in the backing layer and in the adhesive layer(s) is such that any change in said concentration is less than 25% during a period of use of said adhesive film strip.

31. Adhesive film strip according to claim 30, wherein the concentration of the tackifier resin in the backing layer and in the adhesive layer(s) is such that any change in said concentration is less than 15% during a period of use of said adhesive film strip.

32. Adhesive film strip according to claim 30, wherein the concentration of the tackifier resin in the backing layer and in the adhesive layer(s) is such that any change in said concentration is less than 7.5% during a period of use of said adhesive film strip.

33. A method of bonding two materials together for a temporary period of time, wherein once detached, there is no residue, wherein said method comprises binding the two materials with an adhesive film strip according to any one of claims 1–32, and detaching said materials by pulling the strip in the direction of the bond plane.

34. A process for preparing an adhesive film strip according to any one of claims 1–32, comprising:
   a) preparing the backing layer and the adhesive layer(s) as individual primary films; and
   b) laminating together the individual primary films formed in a) to achieve said multi-layer structure.

* * * * *